(12) United States Patent
Bonaccorso

(10) Patent No.: US 12,708,236 B2
(45) Date of Patent: Aug. 18, 2026

(54) AIR FRYER

(71) Applicant: KONINKLIJKE PHILIPS N.V., Eindhoven (NL)

(72) Inventor: Davide Bonaccorso, Eindhoven (NL)

(73) Assignee: VERSUNI HOLDING B.V., Eindhoven (NL)

( * ) Notice: Subject to any disclaimer, the term of this patent is extended or adjusted under 35 U.S.C. 154(b) by 815 days.

(21) Appl. No.: 18/016,852

(22) PCT Filed: Jun. 18, 2021

(86) PCT No.: PCT/EP2021/066683

§ 371 (c)(1),
(2) Date: Jan. 18, 2023

(87) PCT Pub. No.: WO2022/012860

PCT Pub. Date: Jan. 20, 2022

(65) Prior Publication Data

US 2023/0346160 A1 Nov. 2, 2023

(30) Foreign Application Priority Data

Jul. 15, 2020 (EP) .................................... 20185862

(51) Int. Cl.
*A47J 37/06* (2006.01)
*A47J 27/08* (2006.01)
(Continued)

(52) U.S. Cl.
CPC ....... *A47J 37/0641* (2013.01); *A47J 27/0802* (2013.01); *A47J 27/086* (2013.01);
(Continued)

(58) Field of Classification Search
CPC .. A47J 37/0664; A47J 27/0802; A47J 27/086; F24C 15/322; F24C 15/327
See application file for complete search history.

(56) References Cited

U.S. PATENT DOCUMENTS

2013/0156906 A1 6/2013 Raghavan et al.
2019/0045973 A1* 2/2019 Gill ....................... A47J 27/086
(Continued)

FOREIGN PATENT DOCUMENTS

CN 203302892 U 11/2013
CN 205994326 U 3/2017
(Continued)

OTHER PUBLICATIONS

Extended European Search Report issued in connection with corresponding EP Application No. 20185862.8 dated Dec. 4, 2020.

*Primary Examiner* — Thien S Tran
(74) *Attorney, Agent, or Firm* — Maschoff Brennan

(57) ABSTRACT

A pressure cooker for simultaneous pressure cooking and air frying is described. The pressure cooker includes a housing defining a cooking chamber and having a door which can be opened in order to place food items into the cooking chamber and can be sealed closed such that the cooking chamber is air tight. The pressure cooker further includes a basket for supporting the food items to be cooked and is mounted in the cooking chamber during a cooking operation. The pressure cooker furthermore includes an air mover for circulating air within the cooking chamber, and a drive arrangement for driving the air mover.

13 Claims, 4 Drawing Sheets

(51) Int. Cl.

| | |
|---|---|
| ***A47J 27/086*** | (2006.01) |
| ***A47J 27/09*** | (2006.01) |
| ***F24C 15/32*** | (2006.01) |

(52) U.S. Cl.

CPC ........... *A47J 27/09* (2013.01); *A47J 37/0664* (2013.01); *F24C 15/322* (2013.01)

(56) References Cited

U.S. PATENT DOCUMENTS

| | | | |
|---|---|---|---|
| 2019/0110640 | A1 | 4/2019 | Te Velde et al. |
| 2019/0231134 | A1 | 8/2019 | Gill et al. |

FOREIGN PATENT DOCUMENTS

| | | | | |
|---|---|---|---|---|
| CN | 207837417 | U | | 9/2018 |
| CN | 208610644 | U | * | 3/2019 |
| CN | 208610659 | U | | 3/2019 |
| CN | 208876056 | U | | 5/2019 |
| CN | 209644659 | U | | 11/2019 |
| CN | 110558832 | A | | 12/2019 |
| CN | 211242816 | U | * | 8/2020 |
| CN | 216124287 | U | | 3/2022 |
| FR | 2615359 | A1 | | 11/1988 |
| GB | 1359651 | A | | 7/1974 |

* cited by examiner 20
46
48
46
48
52
25
49
24
44
16

AIR FRYER

CROSS-REFERENCE TO RELATED APPLICATIONS

The present application is a U.S. National Phase application under 35 U.S.C. § 371 of International Application No. PCT/EP2021/066683, filed on Jun. 18, 2021, which claims the benefit of European Patent Application No. 20185862.8, filed on Jul. 15, 2020. These applications are hereby incorporated by reference herein.

TECHNICAL FIELD

The present disclosure relates to an air fryer with a cooking compartment which may be sealed such that it can be held at greater than atmospheric pressure during cooking.

BACKGROUND

Some cooking apparatus, such as airfryers, cook food items, such as pieces of meat, fish, and vegetables, by circulating hot air around the food items. Air fryers typically comprise a fan for circulating the air and a heating element for heating the air being circulated. The fan driven air allows faster and more healthy cooking because some of the fat in the food is driven off, and the radiation from the heating element enables browning of the food.

When food is cooked, as long as there is some water content inside the food, the temperature at which the food cooks will not exceed the boiling point of water, so at normal ambient pressure the maximum cooking temperature will be no greater than 100° C. This sets a limit on the speed at which heat can penetrate to the core of the food.

Pressure cookers cook food in a cooking compartment which is sealed and hence the pressure in the cooking compartment is able to rise above ambient pressure as air in the compartment expands and as vapor is driven from the food during cooking. If the pressure within the cooking compartment is increased, the water boiling point is increased, and consequently the maximum temperature at which the food cooks within the cooking compartment and hence the speed of cooking will also increase.

The inventors have found that the combination of air frying combined with pressurizing the cooking compartment provides clear synergistic benefits. Air frying improves the speed of cooking as a result of higher hot air speed over the food, which improves the heat exchange between the air and the food, and pressure cooking improves the speed of cooking by raising the water boiling point. By combining both processes, cooking may be accelerated, whilst the appearance and flavor of the cooked product may be comparable to conventional oven cooked food.

In this combined cooking process, the high air speed on the outside of the food will transmit the heat from the air to the food through its surface. Then once the heat penetrates the food, it will trigger a temperature increase to greater than 100° C. in the pressurized environment, even if water is in it, allowing a faster penetration of heat to the core of the food.

A problem addressed by the present invention is how to provide a pressurized environment, whilst having moving parts inside the cooking compartment. This is achieved in accordance with the present invention by providing a sealed drive arrangement to the fan.

It will be appreciated that any clearance which is provided for example for a motor shaft to be able to pass through the cooking compartment to drive the fan directly, would likely cause unintended leakage of hot air and pressure and a subsequent loss of pressure from the cooking compartment. The problems associated with this comprise a loss of pressure within the cooking compartment and unintended increases in temperature and water condensation in the area where the leakage occurs. This will over time cause damage to components of the cooking apparatus which are outside the cooking compartment, such as control systems and switchgear.

STATEMENTS OF INVENTION

According to an aspect, there is provided a cooking apparatus comprising:

- a housing defining a cooking chamber and having a door which can be opened in order to place food items into the cooking chamber and can be sealed closed such that the cooking chamber is air-tight;
- a basket for supporting food items to be cooked, the basket positioned in the cooking chamber during a cooking operation;
- an air mover (30) for circulating air within the cooking chamber; and
- a drive arrangement for driving the air mover.

According to an additional aspect, there is provided a cooking apparatus comprising:

- a housing defining a cooking chamber and having a door which can be opened in order to place food items into the cooking chamber and can be sealed closed such that the cooking chamber is air-tight;
- a container for supporting food items to be cooked, the container positioned in the cooking chamber during a cooking operation;
- an air mover for circulating air within the cooking chamber; and
- a drive arrangement for driving the air mover.

The container may have at least one mesh side. The container may comprise a container portion and a handle. The container portion may be formed from mesh. The container portion may be formed from metal mesh. The container may be a basket.

The cooking apparatus may be an air fryer. The cooking apparatus may be a pressure cooker. The cooking apparatus may be a combined air fryer and pressure cooker operable to provide above ambient pressures and high speeds of hot air within the cooking chamber. The cooking chamber may be sealed closed such that the cooking chamber is air-tight even when the pressure in the cooking chamber is above ambient pressure".

The drive arrangement is provided to transmit drive from the motor to the air mover. The drive arrangement may comprise a sealed bearing mounted in the housing of the cooking apparatus. Providing a sealed bearing enables transmission of a driving force from the driving means to the air mover through the housing whilst providing an air-tight sealing of the cooking chamber. Consequently, the cooking chamber is pressurizable during cooking of food items, and may for example be pressurizable up to pressures of approximately 2 bar. The speed of the air flow from the air mover may be adjusted to suit a particular application, but may typically provide air speeds in the cooking chamber of up to approximately 10 m/s.

The cooking apparatus may further comprise a heater for heating the air circulated by the air mover. The heater may be operable to provide variable air temperature in the chamber. For example, the heater may be operable to provide an air temperature over 200° C.

The heater may be connectable to a power supply through a wall of the cooking chamber. A sealing arrangement may be provided at the wall, the sealing arrangement being configured to provide a seal between the heater and the wall when the cooking chamber is pressurized. The sealing arrangement may be configured to provide a seal between the heater and the wall when the cooking chamber is pressurized above ambient pressures.

The sealing arrangement may comprise a plate located within the cooking chamber and compressible sealing means located between the plate and the wall of the cooking chamber. The plate may be a compression plate. The heater may be connectable to a power supply via a heating terminal arranged to pass through a hole in the wall of the cooking chamber. The plate may be attached to the heating terminal and arranged on the cooking chamber side of the hole. The plate may be sized to be larger than the hole so as to cover the hole. Sealing means may be provided between the plate and the wall. During pressurization of the cooking chamber, the plate and the sealing means will be compressed against the wall so as to provide an air tight seal between the heater and the wall.

The cooking apparatus may further comprise a pressure regulating valve. The pressure regulating valve may be configured to maintain a desired pressure inside the cooking chamber. The pressure regulating valve may be opened to allow release of steam into the area surrounding the cooking chamber, or may be closed to allow build up of pressure within the cooking chamber.

The cooking apparatus may further comprise a controller configured to adjust the driving means and/or pressure regulating valve to adjust the air speed and/or pressure within the cooking chamber. The controller may operable to adjust the driving means and/or pressure regulation valve in accordance with a predefined cooking programme. The predefined cooking programme may be stored within a memory of the cooking apparatus. In use, a user may select a cooking programme to be operated. The cooking apparatus may further comprise an air speed, temperature, and/or pressure sensors. The air speed, temperature, and/or pressure sensors may be connected to the controller. For efficiency and improved packaging, a single sensor may be used to sense more than one parameter. For example, a combined temperature and pressure sensor may be provided to measure the temperature and pressure in the cooking chamber and provide this information to the controller. The air speed sensor may measure the speed of the air in the cooking chamber and provide this information to the controller. The controller may be operable to adjust the power to the driving means and/or a heater to adjust the air mover speed and temperature in the cooking chamber. The controller may be operable to open or close the pressure regulation valve to increase, decrease or maintain the pressure in the cooking chamber.

A conventional airfryer has a maximum air temperature of approximately 200° C., and the food will only start to increase its temperature above 100° C. once the local water content is evaporated. In fact, water phase transition from liquid to vapor occurs at 100° C. with an isothermal process, regardless of the amount of heat power provided. More heat power will simply speed up the evaporation process. The external surface of the food will lose its water content first. The temperature will then start to rise and, eventually, Maillard reaction will start once the temperature exceeds approximately 154° C., which causes browning of potatoes or chicken skin, for example.

The food core/inner part will still have some water content in it during the typical cooking process, therefore the temperature of the hottest food inner portion still having water in it, will be limited to 100° C. This temperature threshold will limit the speed at which the heat can penetrate to the core of the food. This leads to the conclusion that the cooking speed of the entire food, including its core, will be somehow constrained and limited, by the 100° C. temperature limit. This will lead to a longer time to achieve the required “safe to eat” temperature right through to the core, since the external layers' capability to transmit the heat will be limited to a temperature of 100° C. In a pressurized environment as claimed, this limit is shifted to a point higher than 100° C. and, as a consequence the cooking speed is increased and more versatility is enabled, by adding an additional cooking method, because the cooking apparatus can be used successfully with more recipes, and can replace several other cooking appliances such as a dedicated conventional air fryer and a dedicated conventional pressure cooker.

In addition to the water in the food, water may be introduced into the cooking chamber to increase the rapid production of steam to raise the internal pressure in the cooking chamber. This additional water may be pumped into the cooking chamber from a tank located outside, or may be placed in a water reserve inside the cooking chamber. The additional water is evaporated by means of heat energy during the cooking process. The heat energy could be provided directly or indirectly from the main air heater or may be provided by a secondary dedicated water heater.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

Figure 1:
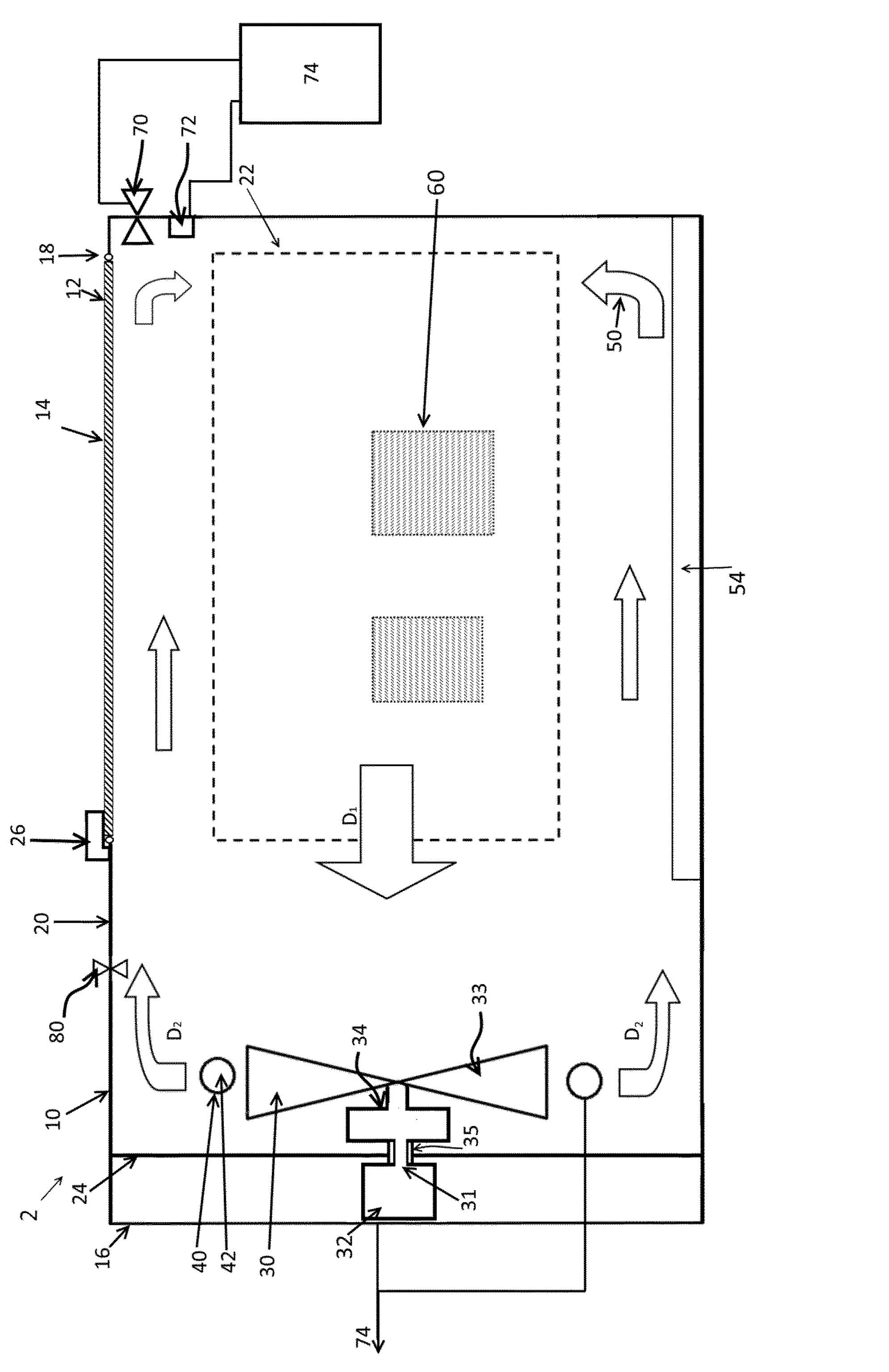
FIG. 1 is a schematic sectional view of a cooking apparatus according to arrangements of the present disclosure.

With reference to FIG. 1, a cooking apparatus 2 according to the present disclosure comprises a housing 10. The housing 10 at least partially defines a cooking chamber 20 to receive food items 60 to be cooked, and a secondary chamber 16 comprising drive means 32. The cooking chamber 20 and the secondary chamber 16 are separated by a dividing wall 24. As depicted, the cooking chamber 20 may be configured to receive a basket 22 within which the food items 60 are contained during cooking. The basket 22 may be removable from the cooking chamber 20 in order to facilitate the loading of food items 60 into the basket 22.

The housing 10 may comprise a door 12, which can be opened in order to place food items 60 and/or the basket 22 into the cooking chamber 20. As depicted, a wall of the cooking chamber 20, such as an upper wall may be formed by the door 12. In some arrangements, the door 12 may comprise a window 14 to enable a user to see the food items 60 within the cooking chamber 20 when the door 12 is closed, e.g. during cooking. A seal 18 is provided around the edge of the door 12, to ensure the door 12 can be sealed in an airtight manner with the surrounding wall of the cooking chamber 20. In other embodiments, the door 12 may be located in a different part of the cooking chamber, e.g. a side wall of the cooking chamber. It will be appreciated by the skilled person that the door 12 may be completely removable from the wall, or may remain attached whilst allowing access to the cooking chamber 20, such as by means of a hinge. The cooking chamber 20 provides an airtight chamber, which can be pressurized during cooking of the food items 60, for example by evaporation of the water content of the food items 60.

A locking mechanism 26 is provided to ensure secure locking of the door 12 in the closed position, for safety during pressurization of the cooking chamber 20. The locking mechanism 26 may be user operated or automatic upon turning on the cooking apparatus 2. The cooking apparatus 2 may be configured to require secure locking of the door 12 to the cooking chamber 20 before supplying power to the drive means 32 or before any heating of the cooking chamber 20. It will be appreciated that the locking mechanism 26 may be provided in an alternative location to that shown, depending upon the location of the door 12.

The cooking apparatus 2 further comprises an air mover 30, such as a fan, located within the cooking chamber 20. The air mover 30 is powered by the drive means 32 provided within the secondary chamber 16. In this arrangement, the air mover 30 is arranged to one side of the cooking chamber 20. In other words, the air mover 30 may be at least partially aligned with the cooking chamber 20, e.g. with the food items 60 within the cooking chamber, in a vertical direction of the cooking apparatus 2.

As depicted, the air mover 30 is arranged to draw air from the cooking chamber 20 in a first direction D1 with a component, e.g. a principal component, in a lateral direction of the cooking apparatus 2 into an inlet of the air mover 30, e.g. onto a leading edge of the fan. The first direction D1 may be aligned with the lateral direction. The air mover 30 may be arranged to eject the air in one or more second directions D2. For example, in the arrangement shown, the air mover 30 is a centrifugal fan configured to receive air in an axial direction of the fan and eject the air in a plurality of radial directions of the fan.

The housing 10 of the cooking device is configured to guide the air ejected from the air mover in the second directions D2 to return to the cooking chamber 20, thereby circulating the air around the cooking apparatus 2. For example, the housing 10 may guide the air ejected by the air mover along an air circulation path 50, such that the air flows towards the center of the housing 10 in a direction with a component, e.g. a principal component, in a vertical direction of the cooking apparatus, and then flows through the food items 60 to be cooked in a generally lateral right to left direction as indicated in FIG. 1. In some arrangements, the cooking apparatus 2 may comprise one or more air guiding structures, such as a starfish geometrical element, provided within the housing 10 for guiding the air ejected from the air mover 30 to the cooking chamber 20. The air guiding structures may be mounted on or integrally formed with the housing 10.

The air mover 30 is powered by drive means 32 provided within the secondary chamber 16. The drive means 32 are arranged to drive the air mover 30 via a drive shaft 31, which is supported in the wall of the cooking chamber by a sealed bearing 35. As the drive shaft 31 passes through a sealed bearing 35, the cooking chamber 20 remains sealed to allow pressurization of the cooking chamber 20 above ambient pressure. As an alternative to the sealed bearing, the drive shaft 31 may pass through a rotary seal (not shown), such as a lip seal, capable of withstanding the maximum pressure which is experienced within the cooking compartment during normal operation.

The air mover 30 comprises a central hub 34 to which a plurality of blades 33 are attached. The air mover 30 is rotatably mounted to the dividing wall 24 so as to allow the hub 34 and blades 33 to rotate relative to the dividing wall.

The speed of the air mover 30 can be increased or decreased as necessary by adjusting the power to the drive means 32.

The cooking apparatus 2 further comprises a heater 40. The heater 40 is configured to heat the air being circulated by the air mover so that the air enters the cooking chamber 20 at a desirable temperature for cooking the food items 60 within the cooking chamber 20. The heater 40 may comprise one or more heating elements 42, such as resistive heating elements, which may be arranged in the flow of air being ejected by the air mover 30. As depicted, the heater 40 may be arranged to the one side of the cooking apparatus, e.g. adjacent to the air mover 30. In one or more arrangements, the heater 40 may comprise one or more heating elements 42 extending in a circular shape about the air mover 30, such that air leaving the air mover in the second directions D2 passes over the heating element 42. It will be appreciated that in other arrangements the heater 40 may have a different configuration and/or may be located in a different location in the cooking apparatus 2.

The heater 40 is fixedly attached to a wall of the cooking chamber, in this embodiment the dividing wall 24. The heater 40 is connected to a power source which is located outside of the cooking chamber, as will be described below. In this embodiment the power source is a mains electricity supply which is connected to the heater via wires which pass through the dividing wall 24 into the secondary chamber 16 and out of an external wall of the secondary chamber 16 to a power supply. In other embodiments, the heater may be powered by a battery, which may be located in the secondary chamber 16.

Figure 2:
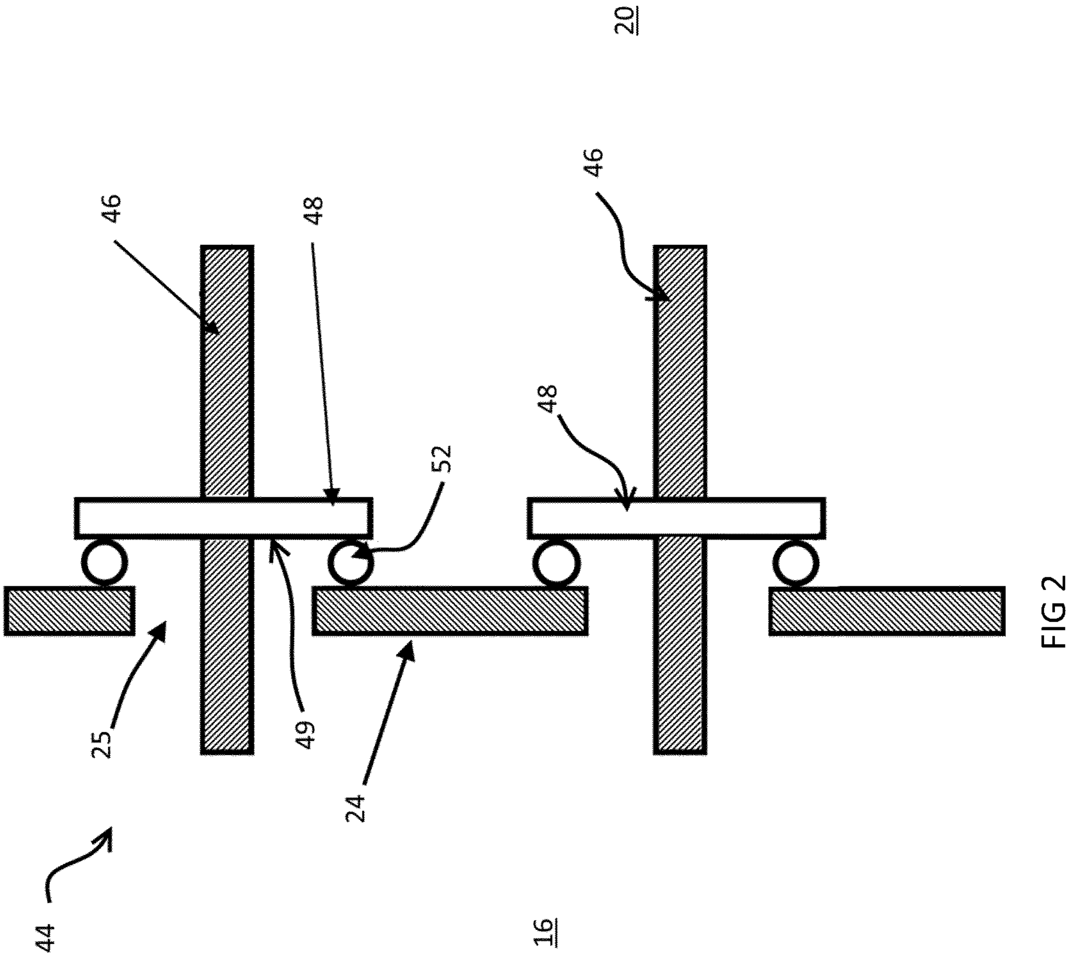
FIG. 2 is a schematic cross-sectional view of a self-sealing arrangement of the cooking apparatus.

As shown in cross-section in FIG. 2, a self-sealing arrangement 44 is provided at the interface between the heater 40 and the dividing wall 24. The self-sealing arrangement 44 is provided to prevent hot air leaving the cooking chamber 20 when the cooking chamber is at high pressure during cooking of the food items 60.

The heater 40 comprises terminal parts 46 for connection to the power supply. The terminal parts 46 are arranged to pass through a hole 25 in the dividing wall 24. A compression plate 48 is attached to each of the terminal parts 46 and extends perpendicularly from each terminal part 46, forming a planar contact surface 49 which is parallel to the dividing wall 24. Sealing means 52, in this embodiment O-rings, are attached to the compression plates 48, between the compression plate 48 and the dividing wall 24. In use, pressurization of the cooking chamber 20 will cause the compression plate 48 to compress the sealing means 52, thus providing a self-sealing arrangement between the cooking chamber 20 and the secondary chamber 16.

The desired pressurization of the cooking chamber 20 is achieved by producing steam in the cooking chamber 20. In this example, the cooking chamber 20 comprises a water reserve 54 used to store water. The water is evaporated during the cooking process due to the heat provided by the heater 40. In other embodiments, a separate heater may be provided to heat the water in the reserve 54.

In an embodiment not illustrated, water may be introduced into the cooking chamber to increase the production of steam and raise the internal pressure in the cooking chamber. This additional water may be pumped into the cooking chamber from a tank located outside, with sealing around the water supply pipe to enable the cooking chamber to be pressurized during the cooking process. The additional water may be evaporated by means of heat energy during the cooking process. The heat energy could be provided directly or indirectly from the main air heater or may be provided by a secondary dedicated water heater. For example, a heated water reserve may be provided outside of the cooking chamber 20 and the water may be heated and turned into steam before pumping the steam into the cooking chamber 20.

Referring back to FIG. 1, the cooking apparatus 2 further comprises a pressure regulation valve 70, an air speed sensor and a heat and/or pressure sensor 72. The pressure regulation valve 70, air speed sensor, heat and pressure sensor 72, heater 40 and motor 32 of the air mover 30 are connected to a controller 74. The heat and pressure sensor 72 measures the heat and pressure in the cooking chamber and provides this information to the controller 74. The air speed sensor measures the speed of the air in the cooking chamber and provides this information to the controller 74. The controller 74 is operable to adjust the power to the heater 40 and/or the motor 32 as necessary to adjust the air mover speed and air temperature in the cooking chamber. The controller 74 is also operable to open or close the pressure regulation valve 70 to increase, decrease or maintain the pressure in the cooking chamber 20 as necessary. The controller 74 receives input from a user as to a desired cooking programme and adjusts the valve and/or power to the heater 40 and/or the motor 32 as necessary. The cooking programme may specify a constant temperature and/or pressure, or a predefined sequence of temperature and/or pressure increases and decreases. For example, the cooking programme may start with cooking under pressure enabling a faster achievement of necessary minimum food core temperature, followed by a browning cycle at ambient pressure by releasing the accumulated water vapor to reduce the pressure in the cooking chamber.

The cooking apparatus further comprises a safety valve 80 which, in the event of an excessive build-up of pressure, for example due to a build-up of steam, automatically opens to enable the controlled release of steam from the cooking chamber 20.

A handle (not shown) is provided to enable lifting of the basket 22 into and out of the cooking chamber before and after cooking. The handle is detachable from and re-attachable to the basket 22 so that the handle can be removed after lifting the basket 22 into the cooking chamber 20. Alternatively, the handle may be fixed to the basket and may be located outside of the cooking chamber during cooking. In order to avoid leakages from the pressurized cooking chamber, a seal would be provided between the basket and the handle. The seal may comprise a sealing mechanism between the handle and the walls of the cooking chamber as described above for the heater.

Figure 3:
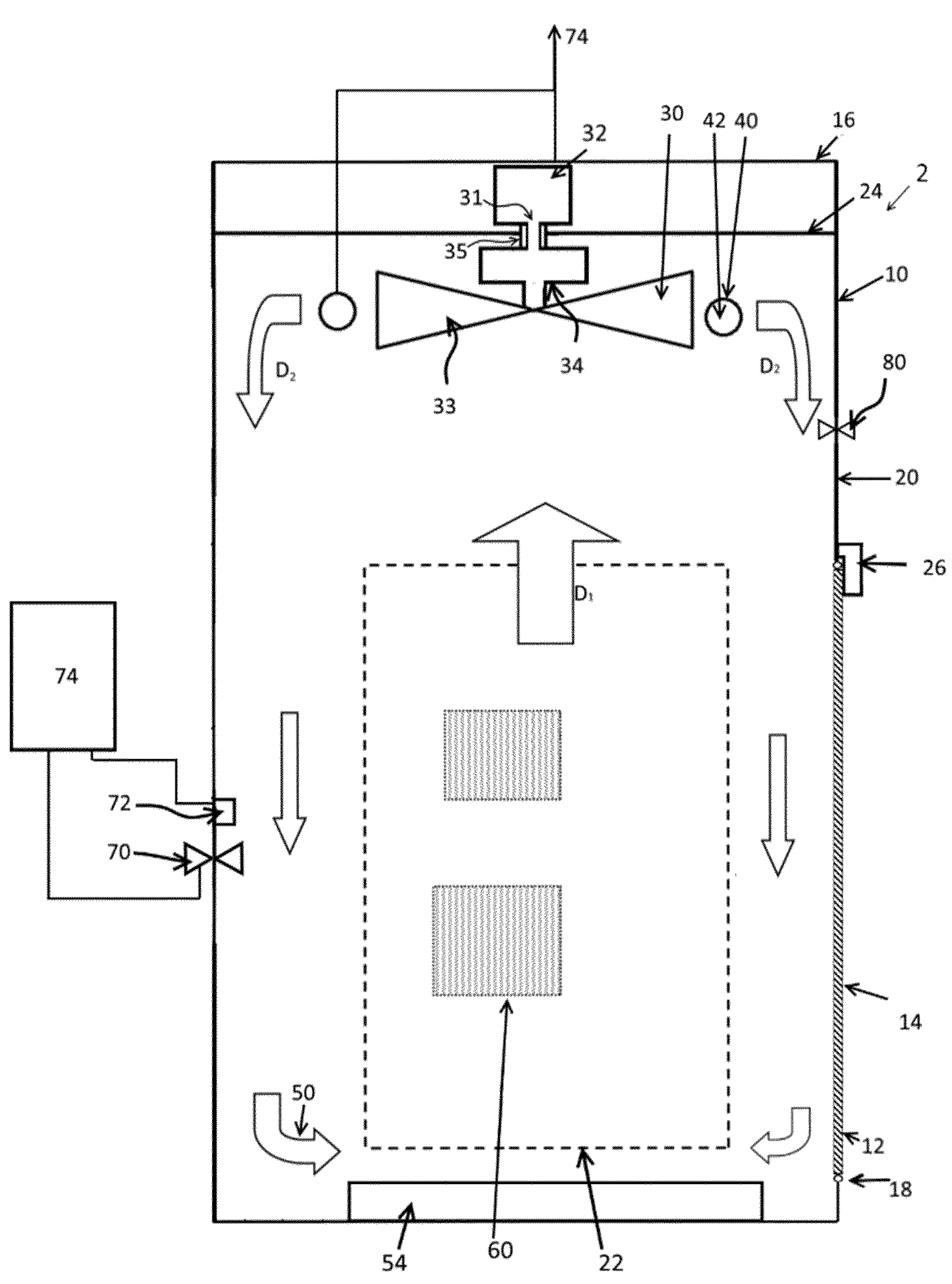
FIG. 3 is a schematic sectional view of a cooking apparatus according to arrangements of the present disclosure.
Figure 4:
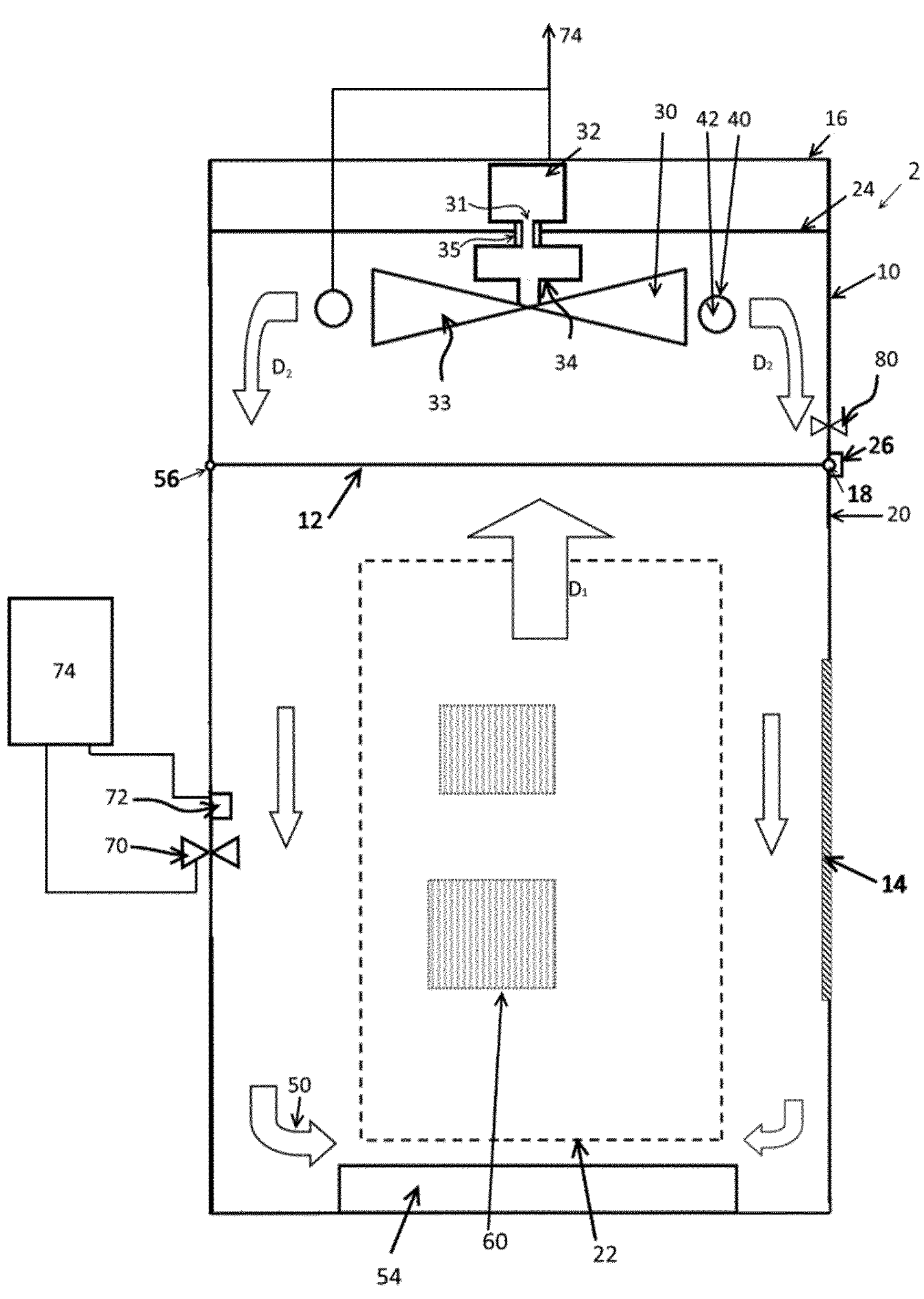
FIG. 4 is a schematic sectional view of a cooking apparatus according to arrangements of the present disclosure.

FIGS. 3 and 4 depict alternative arrangements of the cooking apparatus of FIG. 1. The corresponding features of these alternative arrangements are labelled with the same reference numerals as for FIG. 1 above.

In the arrangements of FIG. 3 and FIG. 4, the fan 30 and heater 40 are located above the basket 22 at an upper end of the cooking chamber 20. As depicted, the air mover 30 is arranged to draw air from the cooking chamber 20 in a first direction D1 with a component, e.g. a principal component, in an upwards direction of the cooking apparatus 2 into an inlet of the air mover 30, e.g. onto a leading edge of the fan. The first direction D1 may be aligned with the vertical direction. The air mover 30 may be arranged to eject the air in one or more second directions D2. For example, in the arrangement shown, the air mover 30 is a centrifugal fan configured to receive air in an axial direction of the fan and eject the air in a plurality of radial directions of the fan.

The housing 10 of the cooking device is configured to guide the air ejected from the air mover in the second directions D2 to return to the cooking chamber 20, thereby circulating the air around the cooking apparatus 2. For example, the housing 10 may guide the air ejected by the air mover along an air circulation path 50, such that the air flows towards the centre of the housing 10 in a direction with a component, e.g. a principal component, in a lateral direction of the cooking apparatus, and then flows through the food items 60 to be cooked in a generally vertical direction as indicated in FIGS. 3 and 4. In some arrangements, the cooking apparatus 2 may comprise one or more air guiding structures, such as a starfish geometrical element, provided within the housing 10 for guiding the air ejected from the air mover 30 to the cooking chamber 20. The air guiding structures may be mounted on or integrally formed with the housing 10.

In the arrangement of FIG. 3, the basket 22 is accessible by a door 12 in the side wall of the cooking chamber 20. In the arrangement of FIG. 4, the door 12 is an upper portion of the cooking chamber which is connected by a hinge 56 to the lower portion of the cooking chamber 20. It will be appreciated that the upper portion of the cooking chamber 20 and the motor chamber may be completely removable from the lower part of the cooking chamber, instead of being connected with a hinge 56. As in the arrangements of FIGS. 1 and 3, the door 12 is provided with seal 18 and locking mechanism 26 for safety during pressurization of the cooking chamber 20. A window 14 is provided in the side wall for viewing of the food items 60 during cooking.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

For the avoidance of doubt, the disclosure extends to the subject matter of the following numbered Statements:

Statement 1. A cooking apparatus comprising:

a housing defining a cooking chamber and having a door which can be opened in order to place food items into the cooking chamber and can be sealed closed such that the cooking chamber is air tight;

a basket for supporting food items to be cooked, and configured to be mounted in the cooking chamber during a cooking operation;

an air mover for circulating air within the cooking chamber; and a drive arrangement for driving the air mover.

Statement 2. A cooking apparatus according to Statement 1, wherein the drive arrangement is configured to transmit drive to the air mover through a wall of the cooking chamber.

Statement 3. A cooking apparatus according to Statement 1 or 2, further comprising a heater for heating the air circulated by the air mover.

Statement 4. A cooking apparatus according to Statement 3, wherein the heater is connectable to a power supply through a wall of the cooking chamber, and wherein a self-sealing arrangement is provided at the wall, the self-sealing arrangement being configured to provide a seal between the heater and the wall when the cooking chamber is pressurized.

Statement 5. A cooking apparatus according to Statement 4, wherein the self-sealing arrangement comprises a plate located within the cooking chamber and compressible sealing means located between the plate and the wall of the cooking chamber.

Statement 6. A cooking apparatus according any preceding Statement, further comprising a water reservoir for the storage of water, and means for evaporating water in the reservoir to provide steam to the cooking chamber.

Statement 7. A cooking apparatus according to any preceding Statement, further comprising a pressure regulating valve.

Statement 8. A cooking apparatus according to Statement 7, further comprising a controller configured to adjust the drive arrangement and/or pressure regulating valve to adjust the air speed and/or pressure within the cooking chamber.

Statement 9. A cooking apparatus according to Statement 8, wherein the controller is operable to adjust the drive arrangement and/or pressure regulation valve in accordance with a predefined cooking programme.

Statement 10. A cooking apparatus according to any preceding Statement, wherein the drive arrangement comprises a motor.

Statement 11. A cooking apparatus according to any preceding Statement, wherein the air mover comprises a fan.

Statement 12. A cooking apparatus according to Statement 10, wherein the air mover is mounted on a drive shaft of the motor.

Statement 13. A cooking apparatus according to Statement 12, wherein the drive shaft is supported in a sealed bearing mounted in a wall of the cooking chamber.

Statement 14. A cooking apparatus according to Statement 12, wherein the drive shaft passes through a rotary seal mounted in a wall of the cooking chamber.

Statement 15. A method of cooking comprising a combination of pressure cooking and air frying, in a cooking apparatus of any preceding Statement.

The invention claimed is:

1. A pressure cooker configured for simultaneous pressure cooking and air frying, the pressure cooker comprising:

a housing defining a cooking chamber and having a door which is opened in order to place food items into the cooking chamber and is sealed closed such that the cooking chamber is air tight;

a basket for supporting the food items to be cooked, and configured to be mounted in the cooking chamber during a cooking operation;

an air mover for circulating air within the cooking chamber;

a drive arrangement for driving the air mover;

a heater connectable to a power supply through a wall of the cooking chamber, for heating the air circulated by the air mover; and a self-sealing arrangement for providing a seal between the heater and the wall when the cooking chamber is pressurized above an ambient pressure.

2. The pressure cooker of claim 1, wherein the drive arrangement is configured to transmit drive to the air mover through a wall of the cooking chamber.

3. The pressure cooker of claim 1, wherein the self-sealing arrangement comprises a plate located within the cooking chamber, and compressible sealing means located between the plate and the wall of the cooking chamber.

4. The pressure cooker of claim 1, further comprising a water reservoir for the storage of water, and means for evaporating the water in the water reservoir to provide steam to the cooking chamber.

5. The pressure cooker of claim 1, further comprising a pressure regulating valve.

6. The pressure cooker of claim 5, further comprising a controller configured to adjust the drive arrangement and the pressure regulating valve to adjust an air speed and a pressure within the cooking chamber.

7. The pressure cooker of claim 6, wherein the controller is operable to adjust the drive arrangement and the pressure regulating valve in accordance with a predefined cooking programme.

8. The pressure cooker of claim 1, wherein the drive arrangement comprises a motor.

9. The pressure cooker of claim 8, wherein the air mover comprises a fan.

10. The pressure cooker of claim 8, wherein the air mover is mounted on a drive shaft of the motor.

11. The pressure cooker of claim 10, wherein the drive shaft is supported in a sealed bearing mounted in a wall of the cooking chamber.

12. The pressure cooker of claim 10, wherein the drive shaft passes through a rotary seal mounted in a wall of the cooking chamber.

13. A method of cooking comprising a combination of pressure cooking and air frying, in the pressure cooker of claim 1.

* * * * *